United States Patent
Yoshikawa

[11] Patent Number: 5,966,246
[45] Date of Patent: Oct. 12, 1999

[54] ZOOM LENS OF THE INNER FOCUSING TYPE

[75] Inventor: Kazuo Yoshikawa, Omiya, Japan

[73] Assignee: Fuji Photo Optical Co., Ltd., Omiya, Japan

[21] Appl. No.: 08/912,749

[22] Filed: Aug. 18, 1997

[30] Foreign Application Priority Data

Aug. 19, 1996 [JP] Japan .................................. 8-237270

[51] Int. Cl.$^6$ .................................................. G02B 15/14
[52] U.S. Cl. .......................... 359/686; 359/684; 359/687; 359/688
[58] Field of Search .................................. 359/684, 686, 359/687, 688, 683, 676

[56] References Cited

U.S. PATENT DOCUMENTS 4,099,845  7/1978  Takesi et al. ........................... 359/684
5,745,300  4/1998  Usui et al. .............................. 359/684
5,757,554  5/1998  Fukami ................................... 359/684

Primary Examiner—Georgia Epps
Assistant Examiner—Jordan M. Schwartz
Attorney, Agent, or Firm—Arnold International; Bruce Y. Arnold

[57] ABSTRACT

A zoom lens having four lens groups, the lens groups having refractive power, in order from the object side, of: fixed positive, variable negative, variable positive or negative, and fixed positive. The first lens group from the object side is composed of three lens subgroups, the middle subgroup of which is moved to perform focusing. The second lens group is moved to vary the amount of zoom, and the third lens group moves when the amount of zoom is varied in order to correct for movement of the image plane resulting when the second lens group is moved. Thus, the optical performance of the zoom lens is favorably maintained over the entire image plane. Further, by satisfying certain conditional equations a system that is compact and can focus objects at very near distances is obtained.

7 Claims, 13 Drawing Sheets

ZOOM LENS OF THE INNER FOCUSING TYPE

BACKGROUND OF THE INVENTION

In the prior art, a focus method for a zoom lens is well known that moves the whole body of a first lens group having positive refractive power when there is a focal adjustment while moving another lens group. However, when the whole body of the first lens group is desired to be moved and focused on a very near object, the effective diameter of the first lens group invariably must be made larger in order to maintain a constant luminous flux at the perimeter of the image plane. This occurs because the first lens group is moved to the object side when focusing on a very near object. This becomes apparent in that the image becomes a wide angle image. Because the lens weight increases when the effective diameter of the first lens group becomes larger, this causes an inconvenience in the case of a zoom lens intended for use on a portable television camera.

As a technique for resolving this problem, the first lens group has been divided into three lens subgroups of negative, positive, and positive refractive power, respectively, in order from the object side. Methods that cause the intermediate subgroup of positive refractive power to move and focus are shown in, for example, Japanese Patent Publications 59-4686 and 6-242378.

Generally, a zoom lens of the inner focusing type moves the first lens group. As compared to a front focus zoom lens that performs the same focusing, the effective diameter of the first lens group becomes smaller than that of the corresponding front focus zoom lens, making it easy to miniaturize the entire body of the lens system when using a zoom lens of the inner focusing type.

On the other hand, a greater variety of photographing construction diagrams have recently been sought. Photographing of very near objects, which requires a wide angle change of the focal distance, has been desired. However, when a wide angle change is attempted, there is a tendency for the effective diameter of the first lens group to become larger.

Generally, when a zoom lens of the inner focusing type is employed, a miniaturization of the zoom lens becomes easy, as stated above. However, when a wide angle change is attempted, a problem develops in that it becomes difficult to obtain a high optical performance while attempting to miniaturize the zoom lens.

BRIEF SUMMARY OF THE INVENTION

The present invention relates to a compact zoom lens of the inner focusing type that is well suited for use with a portable television camera, and specifically, to a zoom lens having an F# of approximately 1.8. The zoom lens has a wide image angle and a short focal distance for imaging very near objects with a zoom ratio of approximately 8–10.

BRIEF DESCRIPTION OF THE DRAWINGS

The present invention will become more fully understood from the detailed description given below and the accompanying drawings. The various embodiments of the invention are given by way of illustration only, and thus, are not limitative of the present invention wherein.

DETAILED DESCRIPTION

A detailed description of the problems associated with prior art zoom lenses will now be given.

Figure 13:
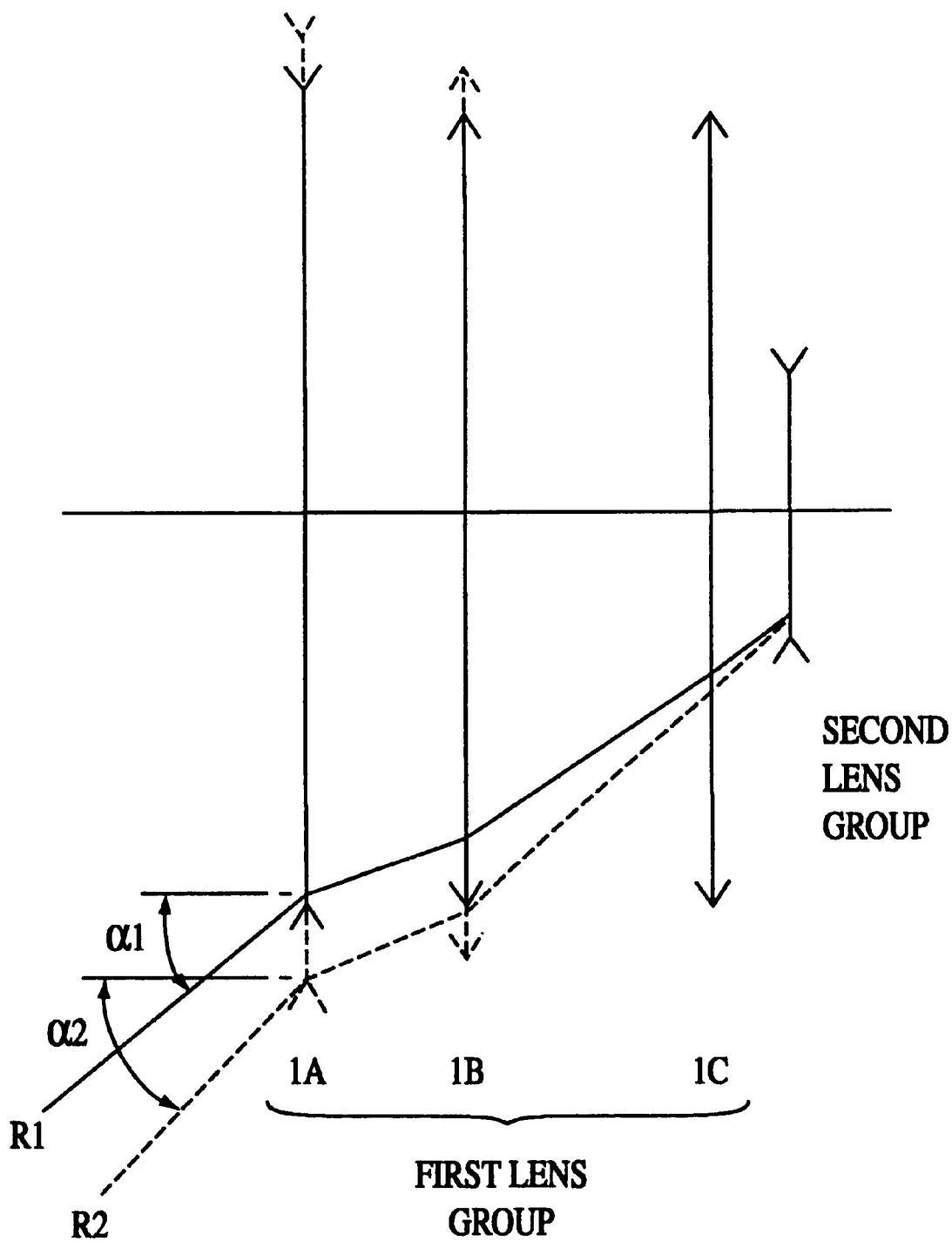

FIG. 13 shows the structure of a first lens group of a prior art zoom lens. The first lens group is formed of a lens 1a of negative refractive power, lens 1b of positive refractive power, and lens 1c of positive refractive power. FIG. 13 also shows the situation of there being near axis refracting power in the first lens group and second lens group. If the image angle becomes larger (e.g., if the principal ray becomes R2 from R1 and the half image angle becomes $\alpha 2$ from $\alpha 1$ where $\alpha 2 > \alpha 1$, the height of the incident light onto lens 1a increases, and the effective diameter of the first lens group must inevitably be made larger.

Therefore, in order to miniaturize the first lens group, lens 1a (onto which principal ray R2 having the largest image angle at the wide angle end is incident) and the outer diameter of lens 1b must become smaller. In order for this to occur, the slant angle of the principal light ray having the largest image angle facing lens 1a from lens 1b must be decreased, or the slant angle of the principal light ray having the largest image angle facing lens 1b from lens 1c must be decreased. Thus, reduction of illumination in the image plane occurs. While reduction of illumination at the image plane may be countered by strengthening the refracting power of lens 1a or lens 1b, such strengthening of the refractive power causes aberrations that are disadvantageous.

The present invention avoids strengthening the refracting power of lens 1a or lens 1b so that aberrations are not a problem. Yet, the present invention provides a zoom lens having a range that provides both a high magnification and a wide viewing angle. Further, the present invention has the purpose of providing a zoom lens of the inner focusing type that can maintain a high optical performance throughout the entire range of magnification of the zoom lens.

Descriptions of various embodiments of the present invention are given below, with reference to the drawings.

Figure 1:
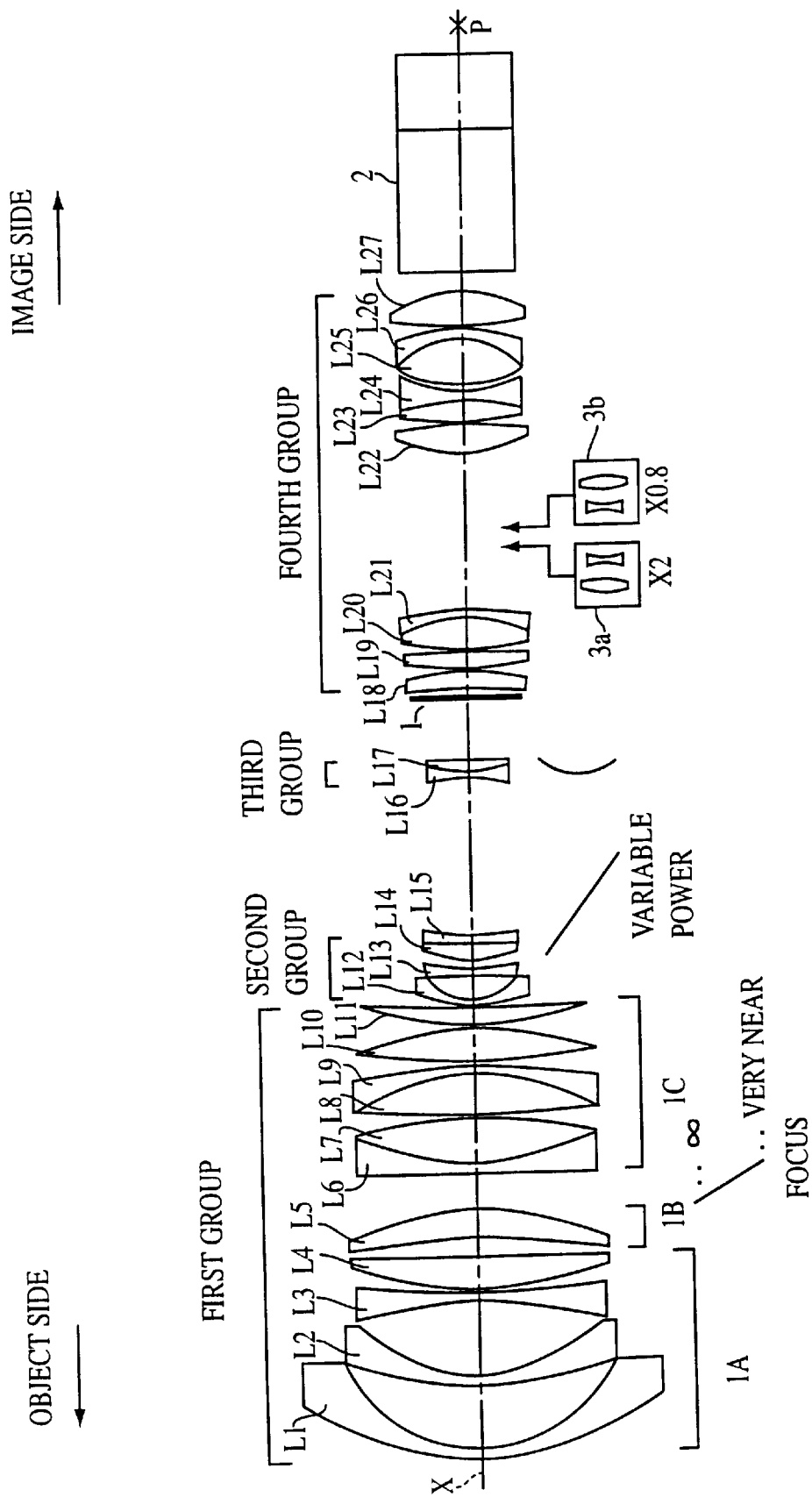
FIG. 1 is a summary figure that shows the structure of a zoom lens according to embodiments 1–3 of the present invention.
Figure 2:
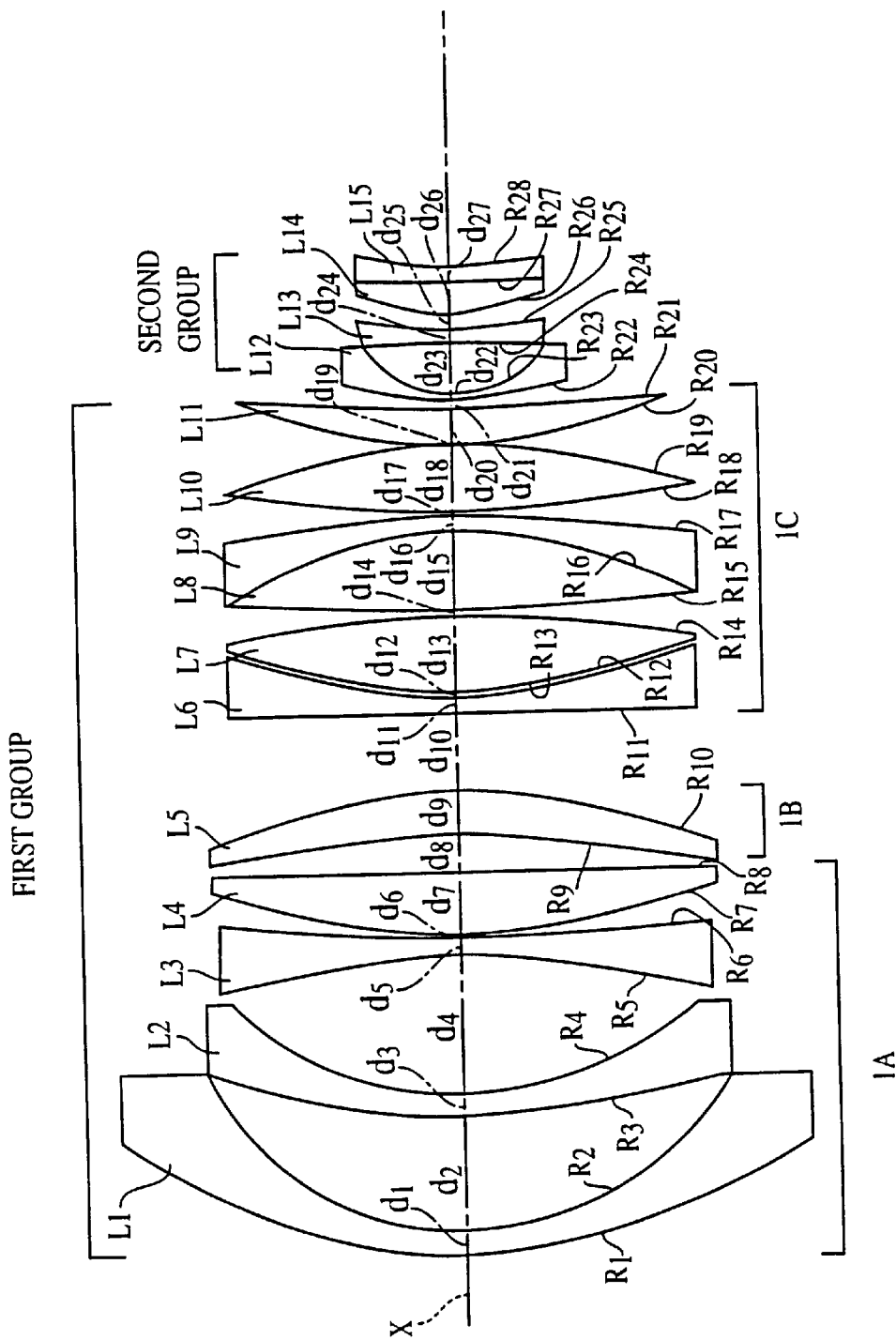
FIG. 2 is an expanded view of one part of the zoom lens shown in FIG. 1.
Figure 3:
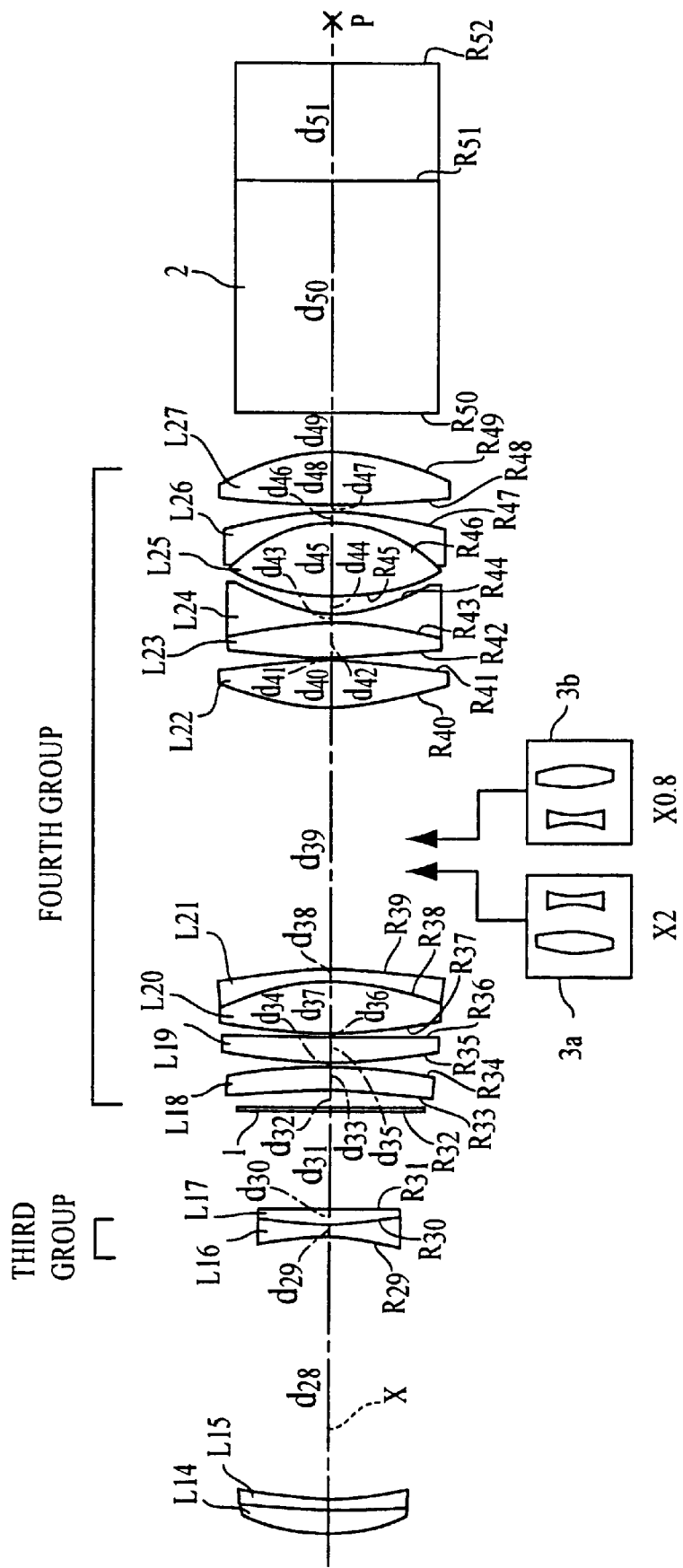
FIG. 3 is an expanded view of another part of the zoom lens shown in FIG. 1.

FIGS. 1 shows the basic construction of the invention, including the basic construction of embodiments 1–3. FIGS. 2 and 3 illustrate expansions of parts of the zoom lens shown in FIG. 1. Referring to FIG. 1, a zoom lens of the inner focusing type having four lens groups according to the invention is illustrated. The zoom lens is arranged, in order from the object side, as follows. There is a first lens group which has fixed positive refracting power when there is variable power, a second lens group which has negative refracting power of variable power and which moves when there is variable power, a third lens group which has positive or negative refracting power for correcting the fluctuations of the image surface accompanying variable power, and a fourth lens group which has fixed positive refracting power when there is variable power. The first lens group is composed of three subgroups 1A–1C and has an arrangement, in order from the object side, as follows. There is lens subgroup 1A which has fixed negative refracting power when there is focal adjustment, lens subgroup 1B which has positive refracting power that moves to the image side when there is focal adjustment from an object at infinity to a near object, and lens subgroup 1C which has fixed positive refracting power when there is a focal adjustment.

In this way, a compact zoom lens having four lens groups is provided. In order to limit the enlargement of the effective diameter of the first lens group, the first lens group is partitioned into 3 subgroups having refractive power of negative, positive and positive. In addition to providing a zoom lens of the inner focus type, which fixes lens subgroup 1A having negative power on the extreme object side and fixes lens subgroup 1C having positive power on the extreme image side, the optical performance over the entire image plane and throughout the entire range of magnification of the zoom lens is favorably maintained. This is achieved by satisfying conditional equations (1) and (2) below.

$0.41 \leq f_W/I$  conditional equation (1)

$1.0 < |f_{1A}/f_1| < 1.5$  conditional equation (2)

wherein, $f_W$ is the focal distance of the zoom lens at the wide angle end,

I is the effective diameter of the image plane, $f_{1A}$ is the focal distance of lens subgroup 1A, and $f_1$ is the focal distance of the first lens group.

In other words, conditional equation (1) regulates the ratio of the focal distance of the zoom lens at the wide angle end divided by the effective diameter of the image plane. Upon dropping below the lower limit, an enlargement of the effective diameter of the first lens group results, and it is undesirable for the distorting aberrations to be enlarged at the wide angle end.

Also, conditional equation (2) regulates the absolute value of the ratio of the focal distance $f_{1A}$ of lens subgroup 1A divided by the focal distance $f_1$ of the first lens group. Upon dropping below the lower limit, the negative refractive power of lens subgroup 1A is too strong and the distortion enlarges at the wide angle end while the astigmatisms enlarge at the telephoto end. On the other hand, upon exceeding the upper limit, the negative refractive power of lens subgroup 1A is too weak, and it is undesirable to cause an enlargement of the lens effective diameter.

Moreover, in the zoom lens of the present invention, it is desirable to satisfy the following conditional equation (3)in order to decrease chromatic aberrations.

$\upsilon_{L5} \geq 68$  conditional equation (3)

wherein, $\upsilon_{L5}$ is the Abbe number of the lens L5 of lens subgroup 1B.

In other words, when dropping below the lower limit of conditional equation (3), the dispersion of the lens L5 of lens group 1B becomes larger, and in particular, the fluctuations of the chromatic aberrations become larger based on the changes of the photographing distance at the telephoto end.

Also, the lens subgroup 1C is formed of six spherical lenses which have an arrangement, in order from the object side, as follows. There is a meniscus lens L6 which has a negative refractive power with its convex surface on the object side, a biconvex lens L7, a lens L8 that has positive refractive power, a meniscus lens L9 that has negative refractive power with its concave surface on the object side, a biconvex lens L10, and a meniscus lens L11 that has positive refracting power with its convex surface on the object side. Further, lenses L8 and L9 are joined, and it is desirable if the Abbe numbers of lenses L8 and L10 are each above 70, and if the Abbe number of lens L6 is below 30.

Also, at large air space $d_{39}$ (FIG. 3) in the fourth lens group, an extender 3a is inserted, which causes the focal distance of the zoom lens to shift to the long focus side. The extender 3a is an afocal system having, from the object side: a front lens group which has positive refractive power, and a rear group which has negative refracting power. A ratio converter 3b is inserted which causes the focal distance of the zoom lens to shift to the short focusing side. The ratio converter 3b is an afocal system having, from the object side: a front lens group which has negative refractive power, and a rear group which has positive refractive power.

Furthermore, when ratio converter 3b is used, even in the case where it is employed on a small TV camera, it is possible to obtain a wide image angle.

Also, in the present invention, as shown in FIG. 1, a diaphragm 1 may be arranged between the third lens group and the fourth lens group, and a color separating prism 2, which includes infrared cut-off filters, may be arranged on the image side of the fourth lens group. The light receiving surface of a solid state device having photographic image elements (such as a CCD array, not illustrated) may be positioned so that it coincides with image point P. Image point P is positioned so that the luminous flux that enters parallel to the optical axis X is focused somewhat to the rear of the final surface of the color separating prism 2.

A detailed description is provided hereafter for three specific embodiments of the invention, including construction and performance parameters for each embodiment. The numbers in Tables 1–6 below are listed in order from the object side. A "*" on the right side of a d value, indicates the group spacings between lens groups (i.e., between the first and second, second and third, and third and fourth lens groups, respectively). A "*" on the left side of a d value indicates the subgroup spacings in the first lens group (i.e., between lens subgroups 1A and 1B, and between lens subgroups 1B and 1C, respectively). These may vary.

Embodiment 1

The zoom lens of embodiment 1 is structured just like that shown in FIGS. 1–3. The radius R (in mm) of each lens element surface, the distance d (in mm) between each lens element surface, the index of refraction $N_d$ (for the sodium d spectral line), as well as the Abbe numbers $\nu_d$ are shown on Table 1, below.

TABLE 1

| S# | R | d | $n_d$ | $v_d$ |
|---|---|---|---|---|
| 1 | 62.154 | 2.50 | 1.81600 | 46.6 |
| 2 | 32.258 | 13.73 | | |
| 3 | 89.370 | 2.10 | 1.88300 | 40.8 |
| 4 | 38.064 | 16.24 | | |
| 5 | −83.546 | 1.90 | 1.72000 | 42.0 |
| 6 | 304.200 | 0.12 | | |
| 7 | 76.401 | 7.12 | 1.80518 | 25.4 |
| 8 | −1540.007 | *4.16 | | |
| 9 | −145.948 | 5.19 | 1.49700 | 81.6 |
| 10 | −65.835 | *8.51 | | |
| 11 | 2839.145 | 1.90 | 1.84666 | 23.9 |
| 12 | 60.408 | 0.48 | | |
| 13 | 65.422 | 9.34 | 1.59240 | 68.3 |
| 14 | −112.229 | 0.12 | | |
| 15 | 245.698 | 7.53 | 1.49700 | 81.6 |
| 16 | −49.902 | 1.90 | 1.56883 | 56.3 |
| 17 | −144.647 | 0.12 | | |
| 18 | 134.028 | 7.53 | 1.43387 | 95.2 |
| 19 | −77.558 | 0.12 | | |
| 20 | 61.674 | 4.14 | 1.80100 | 35.0 |
| 21 | 154.500 | 0.95 *1 | | |
| 22 | 34.672 | 0.95 | 1.77250 | 49.6 |
| 23 | 12.333 | 5.77 | | |
| 24 | −100.160 | 0.95 | 1.83481 | 42.7 |
| 25 | 37.683 | 2.34 | | |
| 26 | 23.160 | 3.41 | 1.80518 | 25.4 |
| 27 | 506.292 | 1.21 | 1.80400 | 46.6 |
| 28 | 57.050 | 34.90 *2 | | |
| 29 | −26.976 | 0.90 | 1.77250 | 49.6 |
| 30 | 42.731 | 2.30 | 1.84666 | 23.9 |
| 31 | −275.740 | 13.20 *3 | | |
| 32 | (diaphragm) | 2.65 | | |
| 33 | −92.079 | 3.70 | 1.48749 | 70.2 |
| 34 | −41.825 | 0.12 | | |
| 35 | 125.050 | 3.40 | 1.51742 | 52.4 |
| 36 | −249.990 | 0.12 | | |
| 37 | 112.852 | 6.80 | 1.60342 | 38.0 |
| 38 | −29.412 | 1.25 | 1.80400 | 49.6 |
| 39 | −89.986 | 34.10 | | |
| 40 | 31.423 | 6.35 | 1.48749 | 70.2 |
| 41 | −76.023 | 0.12 | | |
| 42 | 100.189 | 4.40 | 1.51633 | 64.1 |
| 43 | −57.118 | 1.30 | 1.83400 | 37.2 |
| 44 | 22.198 | 2.21 | | |
| 45 | 32.093 | 9.55 | 1.48749 | 70.2 |
| 46 | −17.168 | 1.25 | 1.83481 | 42.7 |
| 47 | −45.544 | 0.61 | | |
| 48 | 90.415 | 7.10 | 1.48749 | 70.2 |
| 49 | −27.814 | 5.00 | | |
| 50 | ∞ | 30.00 | 1.60342 | 38.0 |
| 51 | ∞ | 16.20 | 1.51633 | 64.1 |
| 52 | ∞ | | | |

Referring to the upper rows of Table 2, below, the spacings $d_{21}$, $d_{28}$ and $d_{31}$ are the spacings between the first and second, second third, and third and fourth lens groups, respectively, at each position of the wide angle end (W), the middle (M) and telephoto end (T). Also given are the focal distances pertaining to infinity at the wide angle end (W), the middle (M) and the telephoto end (T).

In the lower rows of Table 2, below, the values of the focal distance $f_1$ of the first lens group, the focal distance $f_{1A}$ of lens subgroup 1A, and the value of $f_W/I$ (conditional equation (1) are shown, as well as the value of $|f_{1A}/f_1|$ (conditional equation (2)). The effective diameter of the image plane I for this embodiment is 11.0 mm.

TABLE 2

| Surface spaces at time of variable power | W | M | T |
|---|---|---|---|
| $d_{21}$(*1) | 0.953 | 27.951 | 41.108 |
| $d_{28}$(*2) | 34.903 | 6.736 | 6.959 |
| $d_{31}$(*3) | 13.204 | 14.373 | 0.994 |
| Focal Distance (at infinity) | 4.880 | 15.421 | 48.800 |

$f_1 = 27.989$
$f_{1A} = -37.881$
$f_W/I = 0.444$
$|f_{1A}/f_1| = 1.353$

As shown in the lower rows of Table 2, above, the value of $f_W/I$ is 0.444 and the value of $|f_{1A}/f_1|$ is 1.353, which completely satisfy the above conditional equations (1) and (2).

Embodiment 2

The zoom lens of embodiment 2 is structured just like that shown in FIGS. 1–3. The radius R (in mm) of each lens element surface, the distance d (in mm) between each lens element surface, the index of refraction $n_d$ (for the sodium d spectral line), as well as the Abbe numbers $v_d$ are shown on Table 3, below.

TABLE 3

| S# | R | d | $n_d$ | $v_d$ |
|---|---|---|---|---|
| 1 | 60.885 | 2.50 | 1.81600 | 46.6 |
| 2 | 32.258 | 14.01 | | |
| 3 | 94.376 | 2.10 | 1.88300 | 40.8 |
| 4 | 37.720 | 16.20 | | |
| 5 | −84.058 | 1.90 | 1.72000 | 42.0 |
| 6 | 288.329 | 0.12 | | |
| 7 | 76.567 | 7.80 | 1.80518 | 25.4 |
| 8 | −1126.339 | *4.31 | | |
| 9 | −158.650 | 5.06 | 1.56907 | 71.3 |
| 10 | −71.429 | *8.13 | | |
| 11 | 1701.623 | 1.90 | 1.84666 | 23.9 |
| 12 | 59.952 | 0.52 | | |
| 13 | 65.359 | 9.50 | 1.59240 | 68.3 |
| 14 | −109.231 | 0.12 | | |
| 15 | 231.917 | 9.30 | 1.49700 | 81.9 |
| 16 | −49.523 | 1.90 | 1.56883 | 56.3 |
| 17 | −147.479 | 0.12 | | |
| 18 | 128.969 | 7.60 | 1.43387 | 95.2 |
| 19 | −77.894 | 0.12 | | |
| 20 | 62.891 | 3.99 | 1,80100 | 35.0 |
| 21 | 150.622 | 0.95 *1 | | |
| 22 | 34.237 | 0.95 | 1.77250 | 49.6 |
| 23 | 12.324 | 5.78 | | |
| 24 | −98.901 | 0.95 | 1.83481 | 42.7 |
| 25 | 37.247 | 2.41 | | |
| 26 | 23.248 | 3.39 | 1.80518 | 25.4 |
| 27 | 484.577 | 1.21 | 1.80400 | 46.6 |
| 28 | 57.092 | 34.81 *2 | | |
| 29 | −27.045 | 0.90 | 1.77250 | 49.6 |
| 30 | 43.012 | 2.30 | 1.84666 | 23.9 |
| 31 | −271.960 | 13.18 *3 | | |
| 32 | (diaphragm) | 2.65 | | |
| 33 | −89.450 | 3.70 | 1.48749 | 70.2 |
| 34 | −41.781 | 0.12 | | |
| 35 | 121.951 | 3.40 | 1.51742 | 52.4 |
| 36 | −238.096 | 0.12 | | |
| 37 | 118.268 | 6.80 | 1.60342 | 38.0 |
| 38 | −29.171 | 1.25 | 1.80400 | 49.6 |
| 39 | −87.992 | 34.10 | | |
| 40 | 31.548 | 6.35 | 1.48749 | 70.2 |
| 41 | −76.247 | 0.12 | | |
| 42 | 104.105 | 4.40 | 1.51633 | 64.1 |
| 43 | −58.115 | 1.30 | 1.83400 | 37.2 |
| 44 | 22.168 | 2.21 | | |
| 45 | 31.921 | 9.55. | 1.48749 | 70.2 |

TABLE 3-continued

| S# | R | d | $n_d$ | $v_d$ |
|----|---|---|-------|-------|
| 46 | −17.181 | 1.25 | 1.83481 | 42.7 |
| 47 | −45.223 | 0.61 | | |
| 48 | 88.937 | 7.10 | 1.48749 | 70.2 |
| 49 | −27.859 | 5.00 | | |
| 50 | ∞ | 30.00 | 1.60342 | 38.0 |
| 51 | ∞ | 16.20 | 1.51633 | 64.1 |
| 52 | ∞ | | | |

Referring to the upper rows of Table 4, below, the spacings $d_{21}$, $d_{28}$ and $d_{31}$ between each lens group (i.e., between the first and second, second and third, and third and fourth lens groups) at each position of the wide angle end (W), the middle (M) and telephoto end (T) are shown as well as the focal distances for an object at infinity. Also given are the focal distances pertaining to infinity at the wide angle end (W), the middle (M) and the telephoto end (T).

In the lower rows of Table 4, below, the values of the focal distance $f_1$ of the first lens group, the focal distance $f_{1A}$ of lens subgroup 1A, and the value of $f_W/I$ (conditional equation (1)) are shown, as well as the value of $|f_{1A}/f_1|$ (conditional equation (2)). The effective diameter of the image plane I for this embodiment is 11.0 mm.

TABLE 4

| Surface spaces at time of variable power | W | M | T |
|---|---|---|---|
| $d_{21}$(*1) | 0.952 | 27.866 | 40.973 |
| $d_{28}$(*2) | 34.807 | 6.690 | 6.969 |
| $d_{31}$(*3) | 13.176 | 14.379 | 0.993 |
| Focal Distance (at infinity) | 4.860 | 15.358 | 48.600 |

$f_1 = 27.958$
$f_{1A} = -37.352$
$f_W/I = 0.442$
$|f_{1A}/f_1| = 1.336$

As shown in the lower rows of Table 4, above, the value of $f_W/I$ is 0.442 and the value of $|f_{1A}/f_1|$ is 1.336, which completely satisfy conditional equations (1) and (2) above.

Embodiment 3

A zoom lens according to embodiment 3 is structured just like that shown in FIGS. 1–3. The radius R (in mm) of each lens element surface, the distance d (in mm) between each lens element surface, the index of refraction $n_d$ (for the sodium d spectral line), as well as the Abbe numbers $v_d$ are shown on Table 5, below.

TABLE 5

| S# | R | d | $n_d$ | $v_d$ |
|----|---|---|-------|-------|
| 1 | 61.618 | 2.50 | 1.81600 | 46.6 |
| 2 | 32.258 | 13.80 | | |
| 3 | 90.453 | 2.10 | 1.88300 | 40.8 |
| 4 | 37.911 | 16.24 | | |
| 5 | −83.292 | 1.90 | 1.72000 | 42.0 |
| 6 | 316.238 | 0.12 | | |
| 7 | 76.083 | 7.05 | 1.80518 | 25.4 |
| 8 | −2083.836 | *4.19 | | |
| 9 | −130.902 | 5.41 | 1.43985 | 95.0 |
| 10 | −60.947 | *8.80 | | |
| 11 | 1418.646 | 1.90 | 1.84666 | 23.9 |
| 12 | 60.567 | 0.45 | | |
| 13 | 65.360 | 9.30 | 1.59240 | 68.3 |
| 14 | −112.656 | 0.12 | | |
| 15 | 239.601 | 9.18 | 1.49700 | 81.6 |
| 16 | −49.807 | 1.90 | 1.56883 | 56.3 |
| 17 | −147.451 | 0.12 | | |
| 18 | 130.967 | 7.49 | 1.43387 | 95.2 |
| 19 | −79.298 | 0.12 | | |
| 20 | 62.414 | 4.13 | 1.80100 | 35.0 |
| 21 | 158.091 | 0.95 *1 | | |
| 22 | 34.539 | 0.95 | 1.77250 | 49.6 |
| 23 | 12.340 | 5.75 | | |
| 24 | −101.586 | 0.95 | 1.83481 | 42.7 |
| 25 | 37.709 | 2.26 | | |
| 26 | 23.032 | 3.42 | 1.80518 | 25.4 |
| 27 | 506.863 | 1.21 | 1.80400 | 46.6 |
| 28 | 57.159 | 34.96 *2 | | |
| 29 | −26.931 | 0.90 | 1.77250 | 49.6 |
| 30 | 42.680 | 2.30 | 1.84666 | 23.9 |
| 31 | −286.354 | 13.34 *3 | | |
| 32 | (diaphragm) | 2.65 | | |
| 33 | −88.076 | 3.70 | 1.48749 | 70.2 |
| 34 | −42.497 | 0.12 | | |
| 35 | 120.773 | 3.40 | 1.51742 | 52.4 |
| 36 | −233.644 | 0.12 | | |
| 37 | 112.933 | 6.80 | 1.60342 | 38.0 |
| 38 | −29.637 | 1.25 | 1.80400 | 49.6 |
| 39 | −89.759 | 34.10 | | |
| 40 | 31.181 | 6.35 | 1.48749 | 70.2 |
| 41 | −79.713 | 0.12 | | |
| 42 | 98.758 | 4.40 | 1.51633 | 64.1 |
| 43 | −58.486 | 1.30 | 1.83400 | 37.2 |
| 44 | 22.020 | 2.21 | | |
| 45 | 31.879 | 9.55 | 1.48749 | 70.2 |
| 46 | −17.188 | 1.25 | 1.83481 | 42.7 |
| 47 | −45.693 | 0.61 | | |
| 48 | 87.965 | 7.10 | 1.48749 | 70.2 |
| 49 | −27.734 | 5.00 | | |
| 50 | ∞ | 30.00 | 1.60342 | 38.0 |
| 51 | ∞ | 16.20 | 1.51633 | 64.1 |
| 52 | ∞ | | | |

Referring to the upper rows of Table 6, below, the spacings $d_{21}$, $d_{28}$ and $d_{31}$ between each lens group (i.e., between the first and second, second and third, and third and fourth lens groups) at each position of the wide angle end (W), the middle (M) and telephoto end (T) are shown as well as the focal distances for an object at infinity. Also given are the focal distances pertaining to infinity at the wide angle end (W), the middle (M) and the telephoto end (T).

In the lower rows of Table 6, below, the values of the focal distance $f_1$ of the first lens group, the focal distance $f_{1A}$ of lens subgroup 1A, and of $f_W/I$ (conditional equation (1)) are shown as well as the values of $|f_{1A}/f_1|$ (condition equation (2)). Furthermore, the effective diameter of the image plane is 11.0 mm.

TABLE 6

| Surface spaces at time of variable power | W | M | T |
|---|---|---|---|
| $d_{21}$(*1) | 0.953 | 28.075 | 41.298 |
| $d_{28}$(*2) | 34.959 | 6.746 | 6.961 |
| $d_{31}$(*3) | 13.340 | 14.430 | 0.993 |
| Focal Distance (at infinity) | 4.840 | 15.294 | 48.400 |

$f_1 = 27.889$
$f_{1A} = -37.636$
$F_W/I = 0.440$
$|f_{1A}/f_1| = 1.349$

As shown in the lower rows of Table 6, the value of $f_W/I$ is 0.440 and the value of $|f_{1A}/f_1|$ is 1.349, which completely satisfy the above conditional equations (1) and (2).

Figure 4:
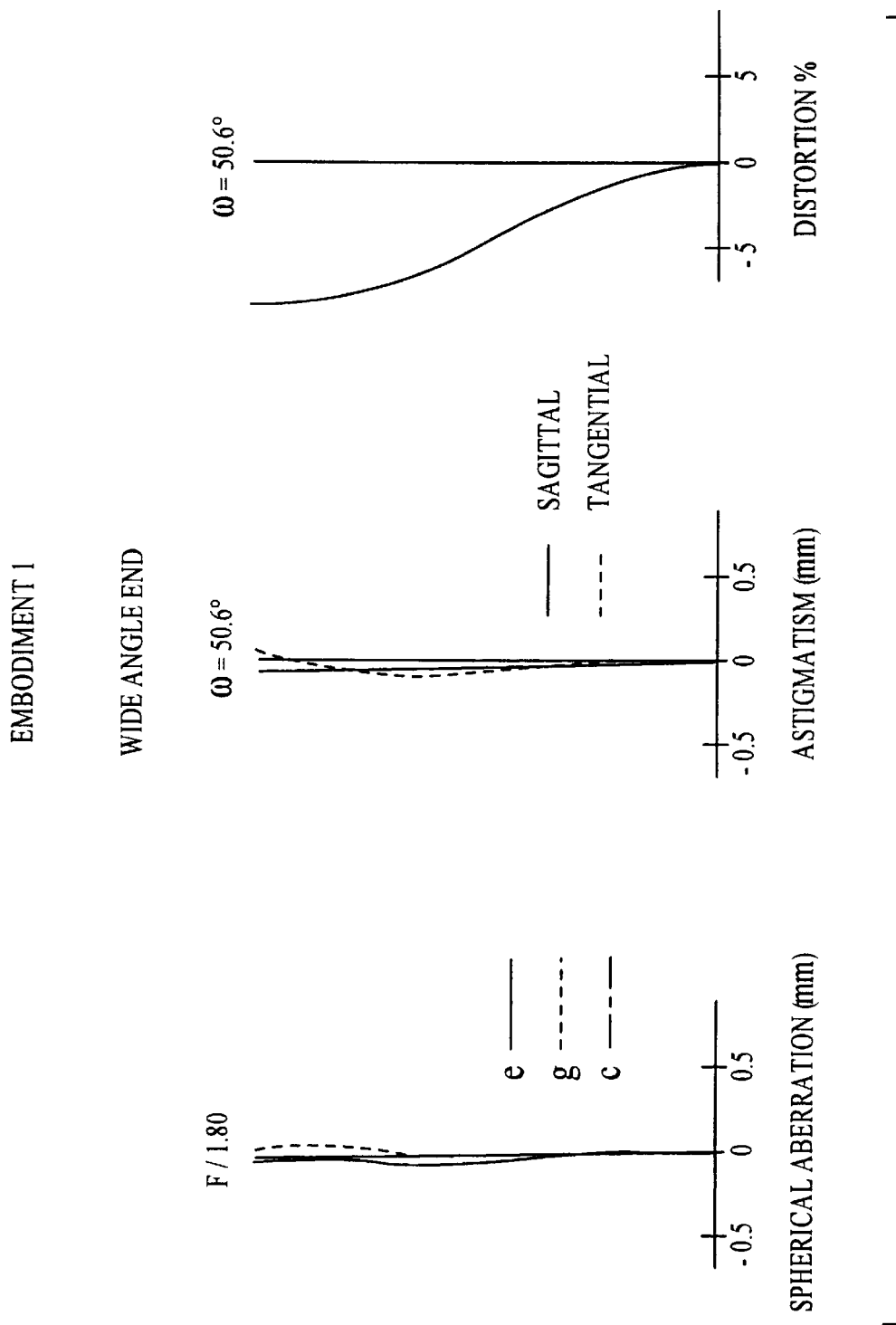
FIG. 4 illustrates aberrations of the zoom lens of embodiment 1 at the wide angle end of its zoom range.
Figure 5:
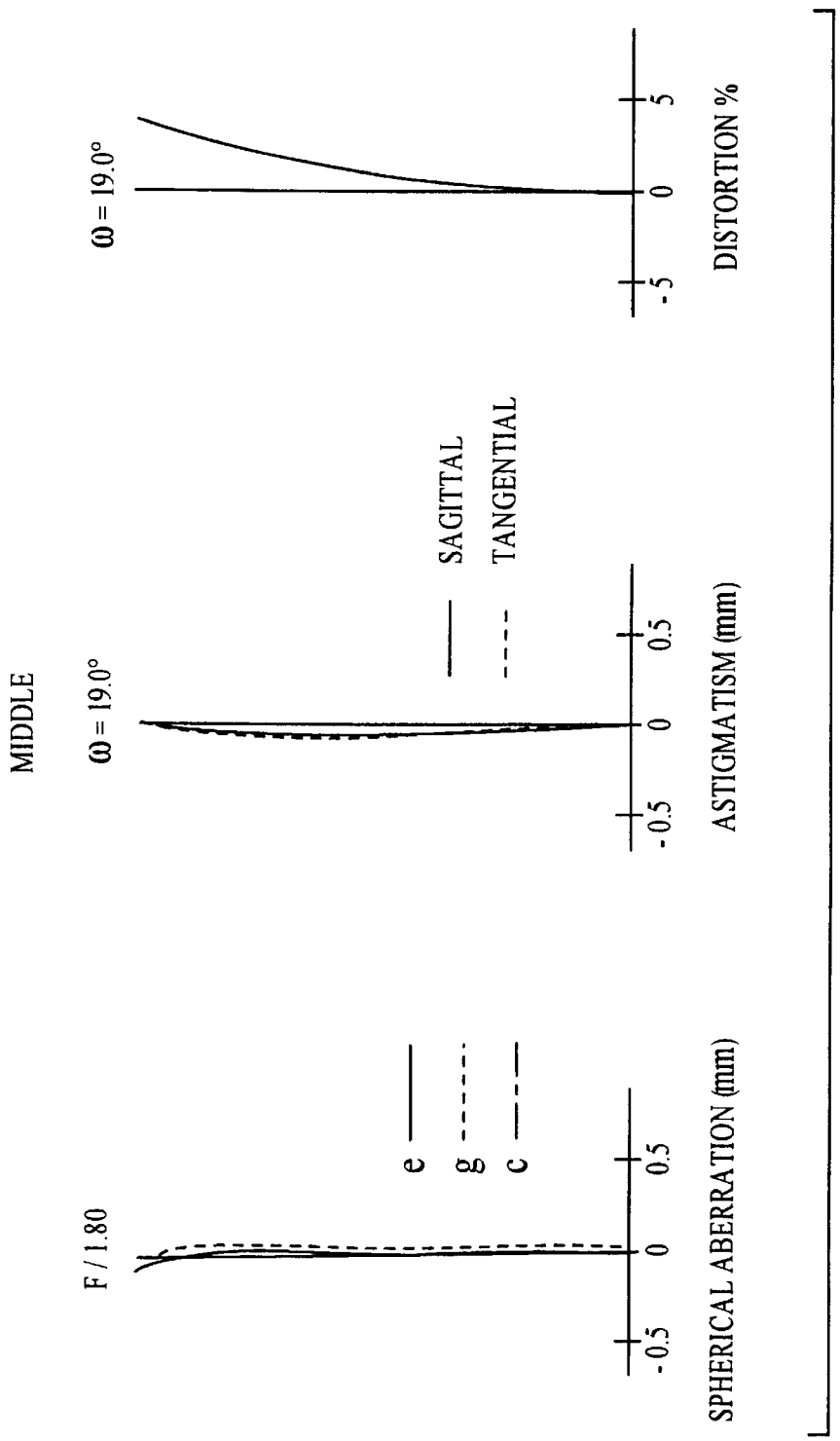
FIG. 5 illustrates aberrations of the zoom lens of embodiment 1 in the middle of its zoom range.
Figure 6:
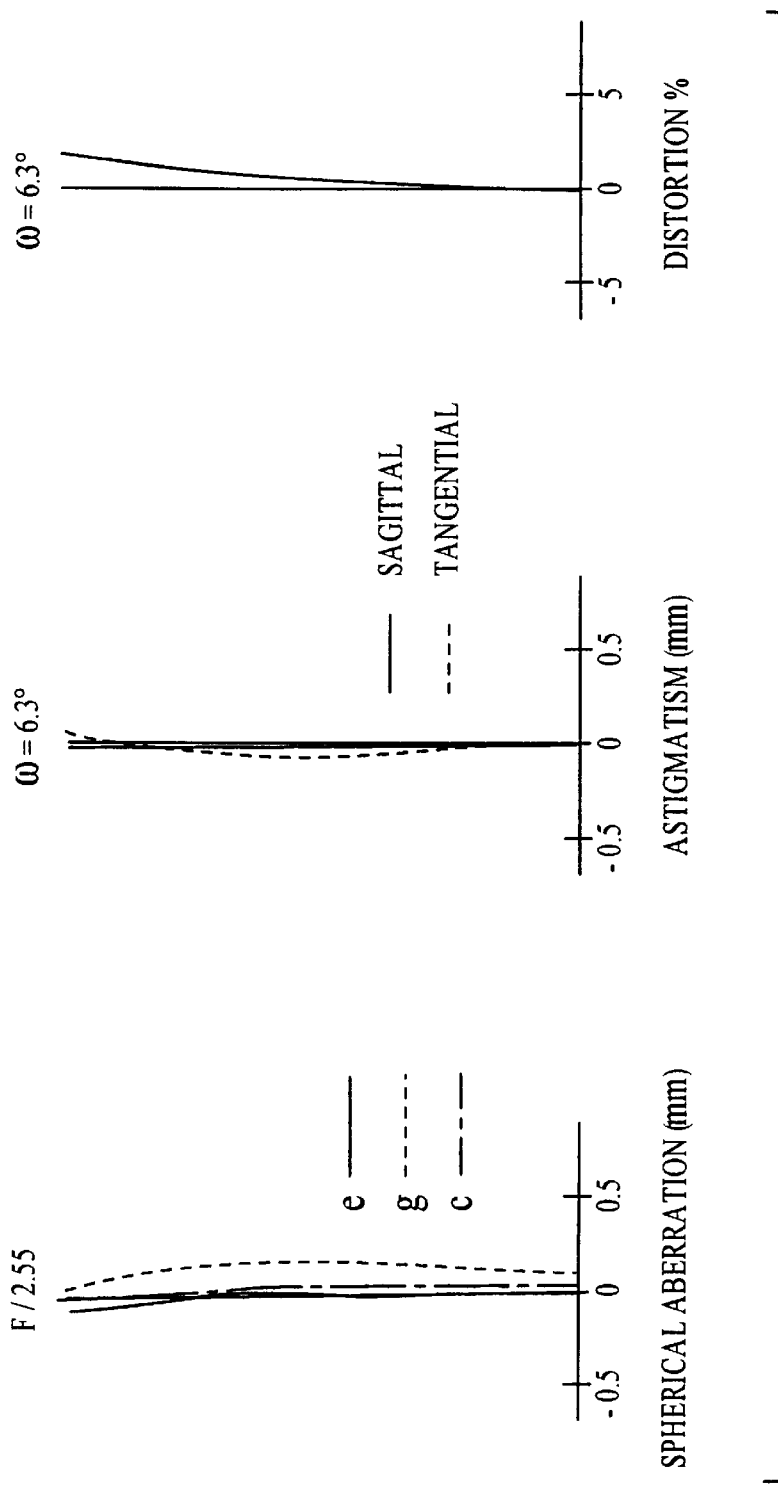
FIG. 6 illustrates aberrations of the zoom lens of embodiment 1 at the telephoto end of its zoom range.
Figure 7:
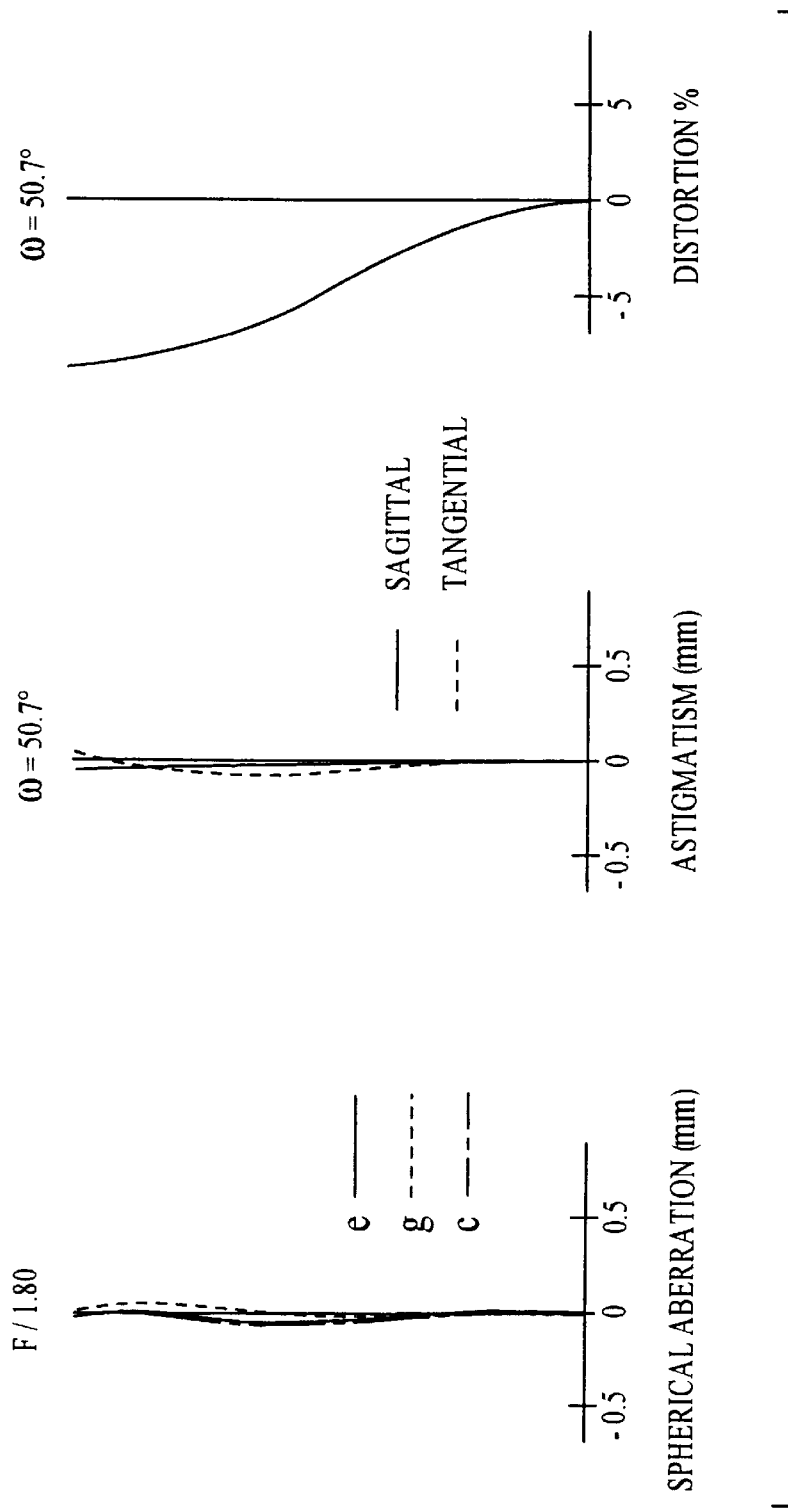
FIG. 7 illustrates aberrations of the zoom lens of embodiment 2 at the wide angle end of its zoom range.
Figure 8:
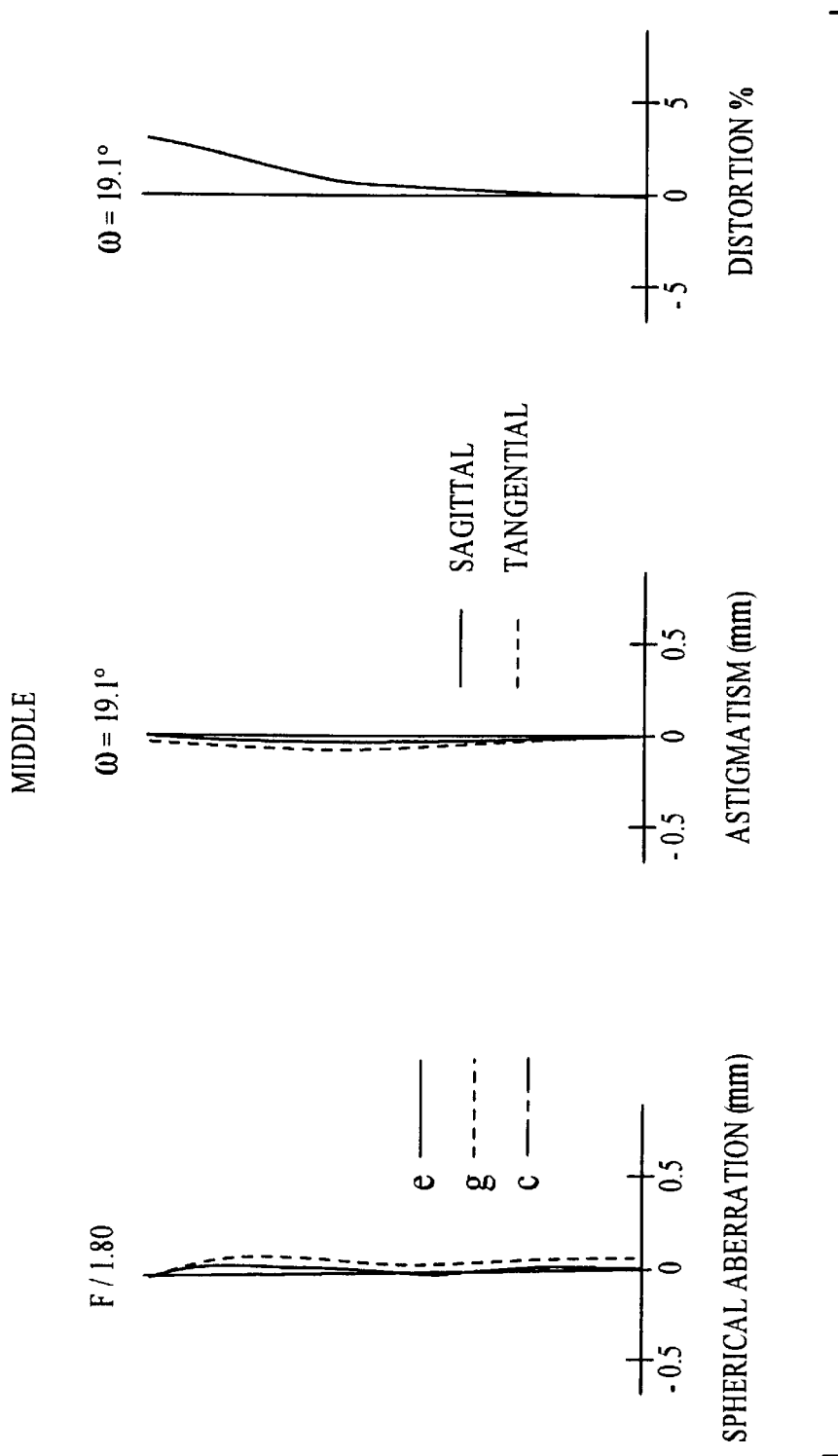
FIG. 8 illustrates aberrations of the zoom lens of embodiment 2 in the middle of its zoom range.
Figure 9:
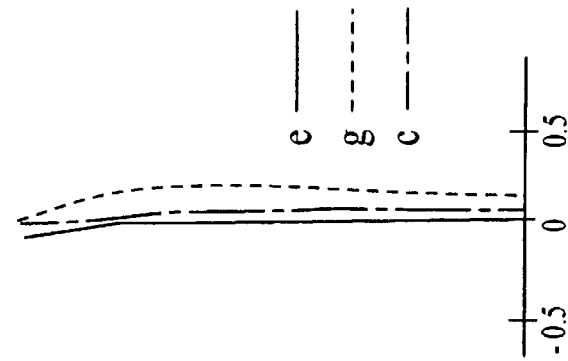
FIG. 9 illustrates aberrations of the zoom lens of embodiment 2 at the telephoto end of its zoom range.

FIGS. 4–6 illustrate the spherical aberration, astigmatism, and distortion at the wide angle end, middle, and telephoto end, respectively, of the zoom lens of embodiment 1. FIGS. 7–9 illustrate the spherical aberration, astigmatism, and distortion at the wide angle end, middle, and telephoto end, respectively, of the zoom lens of embodiment 2.

Figure 10:
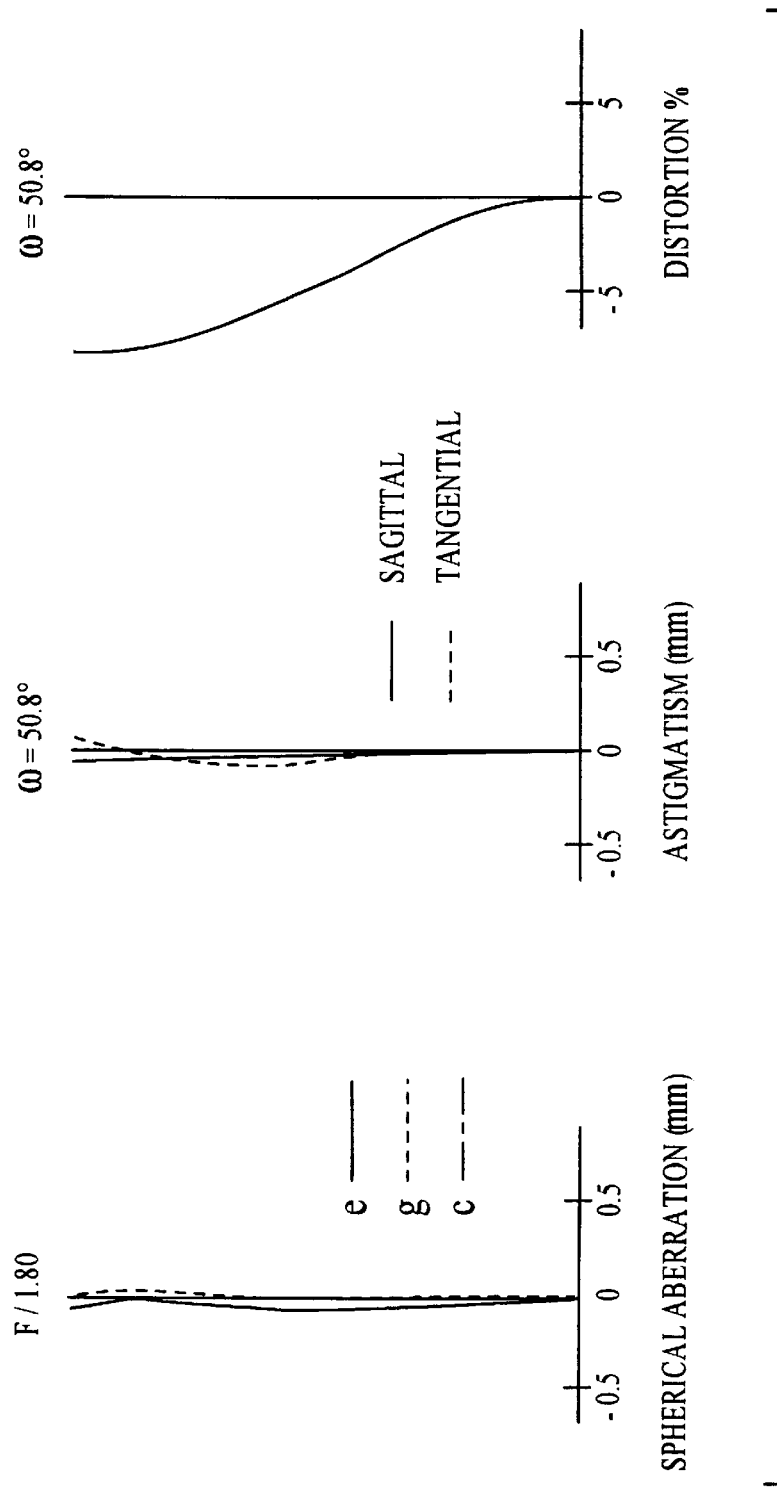
FIG. 10 illustrates aberrations of the zoom lens of embodiment 3 at the wide angle end of its zoom range.
Figure 11:
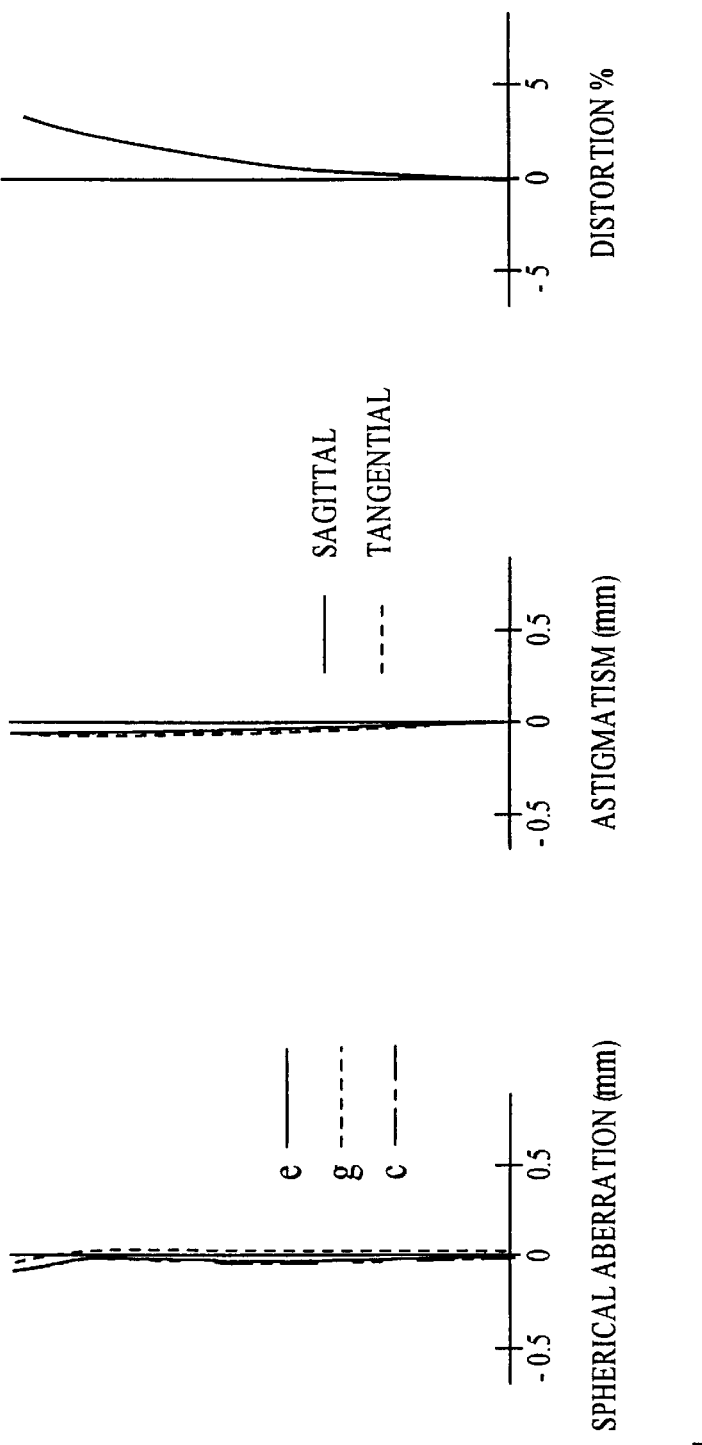
FIG. 11 illustrates aberrations of the zoom lens of embodiment 3 in the middle of its zoom range.
Figure 12:
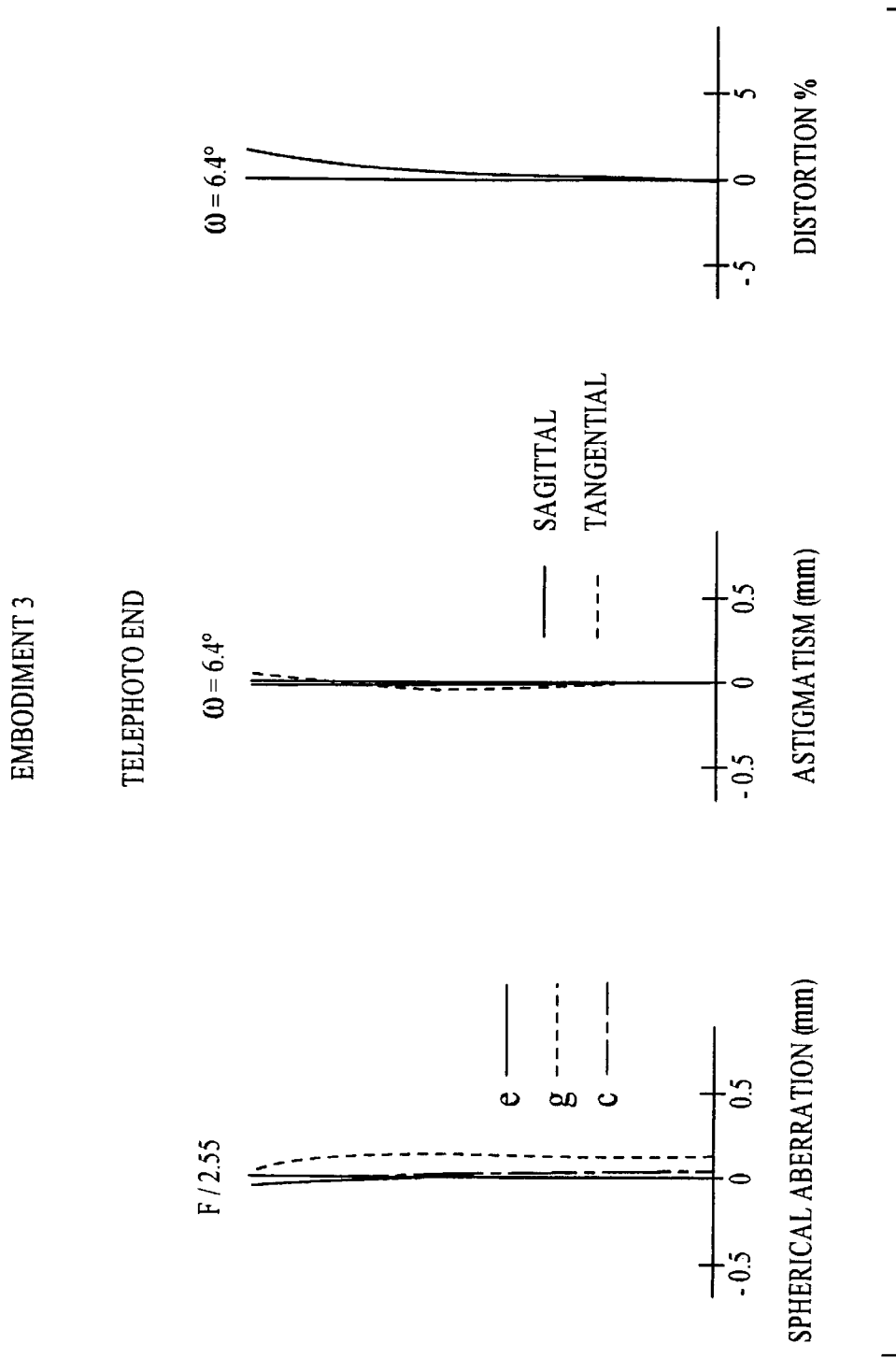
FIG. 12 illustrates aberrations of the zoom lens of embodiment 3 at the telephoto end of its zoom range; and, FIG. 13 is a summary figure for explaining the problems of prior art zoom lenses.

FIGS. 10–12 illustrate the spherical aberration, astigmatism, and distortion at the wide angle end, middle, and telephoto end, respectively, of the zoom lens of embodiment 3.

Having set forth specific embodiments of the present invention for purposes of illustration, the zoom lens of the present invention is not to be limited in scope to these embodiments. For example, the lens shapes which compose all the lens groups and the number of lenses can be appropriately selected.

As explained above, according to the present invention a zoom lens of the inner focusing type, having four lens groups is provided. In order to limit the required effective diameter of the first lens group, the first lens group is partitioned into three subgroups having negative, positive, and positive refractive power, in order from the object side, and an inner focusing method is employed that moves lens group 1B when there is focal adjustment. By ensuring that conditional equations (1) and (2) above are satisfied, the optical performance of the zoom lens over the entire image plane can be favorably maintained throughout the entire variable power range. Further a very compact zoom lens having a wide angle and the ability to focus on objects that are very near to the lens is provided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens of the inner focusing type comprising:

an arrangement, in order from the object side, of a first lens group which has positive refracting power and which lens group is stationary when there is variable power, a second lens group which has negative refracting power and moves when there is variable power, a third lens group which has positive or negative refracting power and is moveable for correcting the fluctuations of the image surface accompanying variable power, and a fourth lens group which has positive refracting power and is stationary when there is variable power;

the first lens group having an arrangement, in order from the object side, of a first lens subgroup which has negative refracting power and is stationary when there is focus adjustment, a second lens subgroup which has positive refracting power and moves to the image side when there is focus adjustment from an object at infinite distance to an object at a near distance, and a third lens subgroup which has positive refracting power and is stationary when there is focus adjustment;

the zoom lens being structured and arranged so that $$0.41 \leq fw/I$$

wherein, fw is the focal distance of the zoom lens at its wide angle end, and

I is the effective diameter of the image plane, and further comprising the third lens subgroup of the first lens group including six lens elements, the six lens elements being composed of, in order from the object side: a meniscus lens which has negative refractive power with its convex surface on the object side; a biconvex lens; a lens that has positive refracting power; a meniscus lens that has negative refracting power with its concave surface on the object side; a biconvex lens; and a meniscus lens that has positive refracting power with its convex surface on the object side.

2. The zoom lens of the inner focusing type as set forth in claim 1 wherein, in the third lens subgroup of the first lens group, the Abbe numbers of the lens that has positive refracting power and the biconvex are each 70.

3. A zoom lens of the inner focusing type comprising:

an arrangement, in order from the object side, of a first lens group which has positive refracting power and which lens group is stationary when there is variable power, a second lens group which has negative refracting power and moves when there is variable power, a third lens group which has positive or negative refracting Dower and is moveable for correcting the fluctuations of the image surface accompanying variable power, and a fourth lens group which has positive refracting power and is stationary when there is variable power;

the first lens group having an arrangement, in order from the object side, of a first lens subgroup which has negative refracting power and is stationary when there is focus adjustment, a second lens subgroup which has positive refracting power and moves to the image side when there is focus adjustment from an object at infinite distance to an object at a near distance, and a third lens subgroup which has positive refracting power and is stationary when there is focus adjustment;

the zoom lens being structured and arranged so that $$0.41 \leq fw/I$$

wherein, fw is the focal distance of the zoom lens at its wide angle end, and

I is the effective diameter of the image plane, and further comprising the third lens subgroup of the first lens group including six lens elements, and wherein the third and fourth lens elements thereof from the object side are joined.

4. The zoom lens of the inner focusing type as set forth in claim 3 wherein, in the third lens subgroup of the first lens group, the Abbe number of the first lens from the object side is below 30.

5. A zoom lens of the inner focusing type comprising:

an arrangement, in order from the object side, of a first lens group which has positive refracting power and which lens group is stationary when there is variable power, a second lens group which has negative refracting power and moves when there is variable power, a third lens group which has positive or negative refracting power and is moveable for correcting the fluctuations of the image surface accompanying variable power, and a fourth lens group which has positive refracting power and is stationary when there is variable power;

the first lens group having an arrangement, in order from the object side, of a first lens subgroup which has negative refracting power and is stationary when there is focus adjustment, a second lens subgroup which has positive refracting power and moves to the image side when there is focus adjustment from an object at infinite distance to an object at a near distance, and a third lens subgroup which has positive refracting power and is stationary when there is focus adjustment;

the zoom lens being structured and arranged so that $$0.41 \leq fw/I$$

wherein, fw is the focal distance of the zoom lens at its wide angle end, and

I is the effective diameter of the image plane, and further comprising the third lens subgroup of the first lens group including six lens elements, and wherein the Abbe numbers of the third and fifth lens elements thereof from the object side are each above 70.

6. A zoom lens of the inner focusing type comprising:

an arrangement, in order from the object side, of a first lens group which has positive refracting power and which lens group is stationary when there is variable power, a second lens group which has negative refracting power and moves when there is variable power, a third lens group which has positive or negative refracting power and is moveable for correcting the fluctuations of the image surface accompanying variable power, and a fourth lens group which has positive refracting power and is stationary when there is variable power;

the first lens group having an arrangement, in order from the object side, of a first lens subgroup which has negative refracting power and is stationary when there is focus adjustment, a second lens subgroup which has positive refracting power and moves to the image side when there is focus adjustment from an object at infinite distance to an object at a near distance, and third lens subgroup which has positive refracting power and is stationary when there is focus adjustment;

the zoom lens being structured and arranged so that $$0.41 \leq fw/I$$

wherein, fw is the focal distance of the zoom lens at its wide angle end, and

I is the effective diameter of the image plane, and further comprising the zoom lens being structured and arranged so that $$1.0 < |f_{1A}/f_1| < 1.5$$

wherein, $f_{1A}$ is the focal distance of the first lens subgroup in the first lens group, and $f_1$ is the focal distance of the first lens group, and, in the third lens subgroup of the first lens group, there are at least four lens elements, with the third and fourth lens elements thereof from the object side being joined.

7. A zoom lens of the inner focusing type comprising:

an arrangement, in order from the object side, of a first lens group which has positive refracting power and which lens group is stationary when there is variable power, a second lens group which has negative refracting power and moves when there is variable power, a third lens group which has positive or negative refracting power and is moveable for correcting the fluctuations of an image surface accompanying variable power, and a fourth lens group which has positive refracting power and is stationary when there is variable power;

the first lens group having an arrangement, in order from the object side, of a first lens subgroup which has negative refracting power and is stationary when there is focus adjustment, a second lens subgroup which has positive refracting power and moves to the image side when there is focus adjustment from an object at an infinite distance to an object at a near distance, and a third lens subgroup which has positive refracting power and is stationary when there is focus adjustment;

the zoom lens being structured and arranged so that $$0.41 \leq fw/I$$

wherein, fw is the focal distance of the zoom lens at its wide angle end, and

I is the effective diameter of the image plane, and further comprising the zoom lens being structured and arranged so that $$1.0 < |f_{1A}/f_1| < 1.5$$

wherein, $f_{1A}$ is the focal distance of the first lens subgroup in the first lens group, and $f_1$ is the focal distance of the first lens group, and, in the third lens subgroup of the first lens group, there are at least five lens elements, with the Abbe numbers of the third and fifth lens elements thereof from the object side each being above 70.

* * * * *

UNITED STATES PATENT AND TRADEMARK OFFICE
CERTIFICATE OF CORRECTION

PATENT NO. : 5,966,246
DATED : Oct. 12, 1999
INVENTOR(S) : Yoshikawa

It is certified that error appears in the above-identified patent and that said Letters Patent is hereby corrected as shown below:

In claim 2, line 4, change "biconvex are each 70" to -- biconvex lens are each above 70 --

Signed and Sealed this

Fourteenth Day of March, 2000

Attest:

Q. TODD DICKINSON

*Attesting Officer*     *Commissioner of Patents and Trademarks*